United States Patent [19]

Abe

[11] Patent Number: 5,186,546

[45] Date of Patent: Feb. 16, 1993

[54] SELF-ALIGNING BEARING AND CLOSED-TYPE ELECTRICALLY DRIVEN COMPRESSOR HAVING THE SAME

[75] Inventor: Nobuo Abe, Tochigi, Japan

[73] Assignee: Hitachi, Ltd., Tokyo, Japan

[21] Appl. No.: 727,115

[22] Filed: Jul. 9, 1991

[30] Foreign Application Priority Data

Jul. 11, 1990 [JP] Japan .................. 2-181665

[51] Int. Cl.⁵ .......................... F16C 23/04; F01C 1/04
[52] U.S. Cl. .................... 384/206; 384/210; 418/55.5; 418/57
[58] Field of Search ............ 384/192, 193, 203, 204, 384/206, 208–210; 418/55.5, 57; 29/898.044, 898.043, 898.051

[56] References Cited

U.S. PATENT DOCUMENTS

| 2,541,160 | 2/1951 | Heim | 29/898.051 |
| 2,711,352 | 6/1955 | Hasko et al. | 384/208 |
| 2,759,244 | 8/1956 | Heim | 3984/206 X |
| 3,583,775 | 6/1971 | Potter et al. | 384/208 |
| 4,076,343 | 2/1978 | McCloskey | 384/210 |
| 4,116,504 | 9/1978 | Cass | 384/210 |
| 4,730,998 | 3/1988 | Kakuda et al. | 384/312 X |
| 4,836,758 | 6/1989 | Elson et al. | 418/55.5 |

FOREIGN PATENT DOCUMENTS

| 70003 | 4/1983 | Japan | 418/57 |
| 172402 | 10/1983 | Japan | 418/55.5 |

Primary Examiner—Thomas R. Hannon
Attorney, Agent, or Firm—Antonelli, Terry, Stout & Kraus

[57] ABSTRACT

The rotary shaft of a closed-type electrically driven compressor is rotatably supported by self-aligning bearings. Each bearing has a spherical bearing member, a supporting member and a bushing. The supporting member has a concave spherical inner surface and a cylindrical inner surface. The bushing has a concave spherical inner surface and a cylindrical outer surface and is fitted into a space defined by the cylindrical inner surface of the supporting member. The concave spherical inner surface of the supporting member and that of the bushing movably support the spherical bearing member.

2 Claims, 3 Drawing Sheets

SELF-ALIGNING BEARING AND CLOSED-TYPE ELECTRICALLY DRIVEN COMPRESSOR HAVING THE SAME

BACKGROUND OF THE INVENTION

Field of the Invention

The present invention relates to a self-aligning bearing and a closed-type electrically driven compressor having the same. The self-aligning bearing is suitable for reducing the level of noise and vibration. The closed-type electrically driven compressor is suitable for use in refrigerating or cooling device such as a household room air conditioner, a car air conditioner or a refrigerator.

Description of the Related Art

A conventional self-aligning bearing comprises a spherical bearing member having a convex spherical outer surface and a through-hole for rotatably supporting a rotary shaft, and a supporting member having a concave spherical inner surface which rotatably supports the spherical bearing member.

The conventional self-aligning bearing is assembled in the following manner. At first, the supporting member is shaped such that, a part of the inner surface thereof has a cylindrical shape, while the remaining part of the inner surface has a concave spherical shape. The spherical bearing member is inserted into the supporting member through the opening defined by the cylindrical part of the inner surface, and disposed in the supporting member. Subsequently, the cylindrical part of the inner surface is deformed into a spherical shape by subjecting the supporting member to plastic working so that the spherical bearing member is held in place in the supporting member while being prevented from becoming disengaged.

Because the conventional self-aligning bearing requires the supporting member to be subjected to the above-described plastic working, the supporting member must be made of a material having a good fluidity. This means that it is impossible to make the supporting member from a material which can be prepared at low a cost, such as cast iron.

Further, subtle variations in the plastic working stress which inevitably occur, variations in the material of the supporting member, and/or other causes make it difficult to form the inner surface of the supporting member into exactly the same shape as desired. Sometimes, therefore, the spherical bearing member and the supporting member may stick to each other. In other cases, the desired size of the gap between the spherical bearing member and the supporting member cannot be ensured, resulting in a large gap between these members. In such cases, it is difficult to prevent noise or vibration generated by substantial free play of the spherical bearing member in the supporting member.

Consequently, a closed-type electrically driven compressor having such self-aligning bearing inevitably suffers from generation noise and vibration.

SUMMARY OF THE INVENTION

An object of the present invention is to provide a self-aligning bearing in which the size of the gap between the spherical bearing member and the supporting member is maintained at a desired appropriate dimension.

Another object of the present invention is to provide a self-aligning bearing having a supporting member made of an inexpensive material, thus resulting in a reduction in cost.

A further object of the present invention is to provide a closed-type electrically driven compressor having such self-aligning bearing, the compressor thus assuring low levels of noise and vibration.

According to one aspect of the present invention, there is provided a self-aligning bearing including: a spherical bearing member having a convex spherical outer surface and a first through-hole for rotatably supporting a rotary shaft; and a member supporting the spherical bearing member. The supporting member has a second through-hole, a part of the second through-hole having a concave spherical inner surface movably supporting the convex outer surface of the spherical bearing member, the remaining part of the second through-hole having a cylindrical inner surface. An annular shoulded portion is formed between the cylindrical inner surface and the concave spherical inner surface, the annular shoulder portion extending radially inward from the cylindrical inner surface to the concave spherical inner surface. The bearing further includes a bushing having a concave spherical inner surface movably supporting the convex outer surface of the spherical bearing member in cooperation with the concave spherical inner surface of the supporting member, the bushing also having a cylindrical outer surface fitted into the cylindrical inner surface of the supporting member. The bushing holds the spherical bearing member in position in the supporting member while preventing their disengagement.

According to another aspect of the present invention, there is provided a closed-type electrically driven compressor including: closed vessel; an electric motor disposed in the vessel; a rotary shaft driven by the electric motor; a compressing mechanism connected to the rotary shaft; a first bearing positioned between the compressing mechanism and the electric motor for rotatably supporting the rotary shaft; and a second bearing positioned on that side of the electric motor remote from the compressing mechanism to rotatably support the rotary shaft. At least one of the first bearing and the second bearing comprises a self-aligning bearing which includes: a spherical bearing member having a convex spherical outer surface and a first through through-hole for rotatably supporting the rotary shaft; and a member supporting the spherical bearing member, the supporting member having a second through-hole, a part of the second through-hole having a concave spherical inner surface movably supporting the convex outer surface of the spherical bearing member, the remaining part of the second through-hole having a cylindrical inner surface, an annular shoulder portion being formed between the cylindrical inner surface and the concave spherical inner surface, the annular shoulder portion extending radially inward from the cylindrical inner surface to the concave spherical inner surface. The bearing further includes a bushing having a concave spherical inner surface movably supporting the convex outer surface of the spherical bearing member in cooperation with the concave spherical inner surface of the supporting member, the bushing also having a cylindrical outer surface fitted in the cylindrical inner surface of the supporting member, the bushing holding the spherical bearing member in position in the supporting member while preventing their disengagement.

The self-aligning bearing according to the present invention eliminates the need to subject the supporting member to plastic working. The bushing, fitted in a space defined by the cylindrical inner surface of the supporting member, holds the spherical bearing member in position in the supporting member while preventing these members from becoming disengaged from each other. Therefore, the depth to which the bushing is fitted is properly adjusted, so that the size of the gap between the spherical bearing member, on one hand, and the supporting member and the bushing, on the other, can be easily maintained at an appropriate dimension. Thus, it is possible to reduce the level of noise and vibration.

Further, it is possible to make the supporting member from a casting material which possesses an excellent ability of being formed into a complicated shape and which is yet inexpensive, such as cast iron.

At least one of the supporting member and the bushing may be produced easily by a cold plastic forming method, a power metallurgical method, or a machining method.

A closed-type electric compressor incorporating such a self-aligning bearing is naturally capable of operating with low levels of noise and vibration.

The above and other objects, features and advantages of the present invention will become more apparent from the following description.

DESCRIPTION OF A PREFERRED EMBODIMENT

Figure 1:
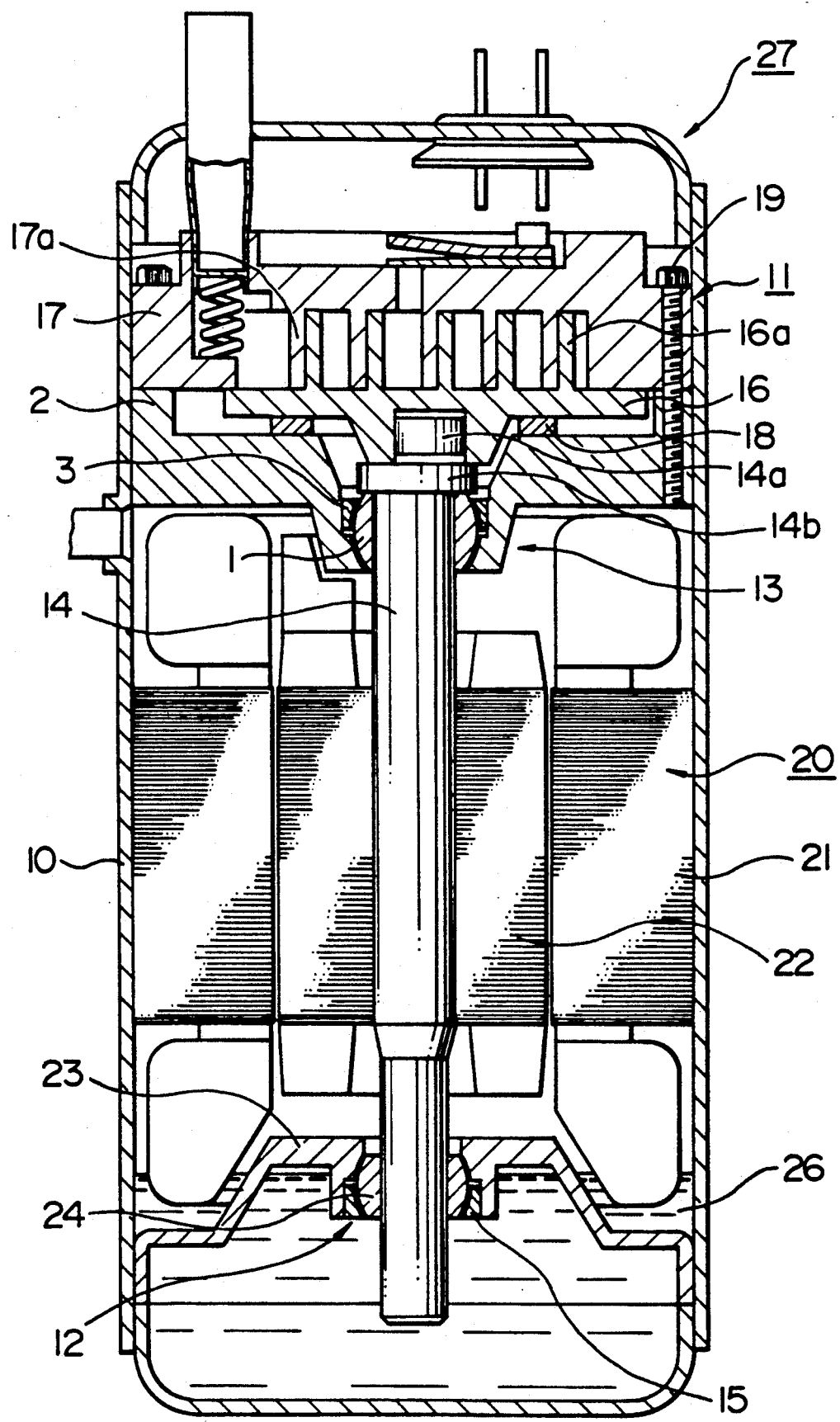
FIG. 1 is a vertical section of a closed-type electrically driven compressor embodying the present invention.

Referring to FIG. 1, a closed-type electrically driven compressor 27 according to an embodiment of the present invention basically comprises a closed vessel 10, a compressing mechanism 11 and an electric motor 20, the mechanism 11 and the motor 20 being disposed inside the vessel 10. The compressing mechanism 11 comprises an orbiting scroll member 16 and a stationary scroll member 17. The electric motor 20 comprises a stator 21 fixed to the inner surface of the vessel 10 and a rotor 22 provided on a rotary shaft 14 rotatably supported by a first bearing 13 and a second bearing 12.

The first bearing 13 is positioned between the electric motor 20 and the compressing mechanism 11. The second bearing 12 is positioned on that side of the electric motor 20 remote from the compressing mechanism 11. The first bearing 13 is a self-aligning bearing comprising a spherical bearing member 1 by which the shaft 14 is rotatably supported, a supporting member 2 secured to the inner surface of the vessel 10 and a bushing 3. Similarly, the second bearing 12 is a self-aligning bearing comprising a spherical bearing member 24, a supporting member 23 and a bushing 15.

The rotary shaft 14 has an eccentric portion or a crackpin 14a and a flange 14b which are both positioned at a first end (upper end, as viewed in FIG. 1) of the shaft 14. The orbiting scroll member 16 is connected to the eccentric portion 14a. The orbiting scroll member 16 has an orbiting scroll wrap 16a which cooperates with a stationary scroll wrap 17a of the stationary scroll member 17 mounted on the supporting member 2 by bolts 19 to perform the operation of compressing a fluid in a known manner. In order to prevent rotation of the orbiting scroll member 16, an Oldham's ring 18 is disposed between the orbiting scroll member 16 and the supporting member 2. At the bottom of the interior of vessel 10, lubricating oil 26 is stored.

The spherical bearing member 1 of the first bearing 13 and the spherical bearing member 24 of the second bearing 12 rotatably support the rotary shaft 14, while these spherical bearing members 1 and 24 are movable or rotatably supported by the supporting members 2 and 23, respectively, to provide a self-aligning function.

The orbiting scroll wrap 16a of the orbiting scroll member 16 and the stationary scroll wrap 17a of the stationary scroll member 17 are in meshing engagement with each other to define compression chambers. When the rotary shaft 14 is rotated, the orbiting scroll member 16 mounted on the eccentric portion 14a of the rotary shaft 14 performs an orbiting movement. This movement causes changes in the volumes of the compression chambers, whereby fluid is sucked and compressed. Compressed fluid is discharged into the vessel 10.

The first bearing 13 and the second bearing 12 receive and bear, with good balance, a pressure applied to the rotary shaft 14 by the movement of the orbiting scroll member 16 and the inertial force applied to the rotary shaft 14 by the electric motor 20. A part of the lubricating oil 26 moves through oil holes (not shown) formed in the rotary shaft 14 and is supplied to the sliding portions of the first and second bearings 13 and 12.

Although the embodiment of the closed-type electrically compressor according to the present invention shown in FIG. 1 includes the first and second bearings 13 and 12 which individually consist of self-aligning bearings, it is not essential that bearings of this type are both used as bearings in a single compressor. If at least one of the bearings in a closed-type electric compressor comprises a self-aligning bearing, it is possible to substantially reduce the level of noise and vibration generated by the compressor.

Next, the first bearing 13 shown in FIG. 1 will be described in detail.

Figure 2:
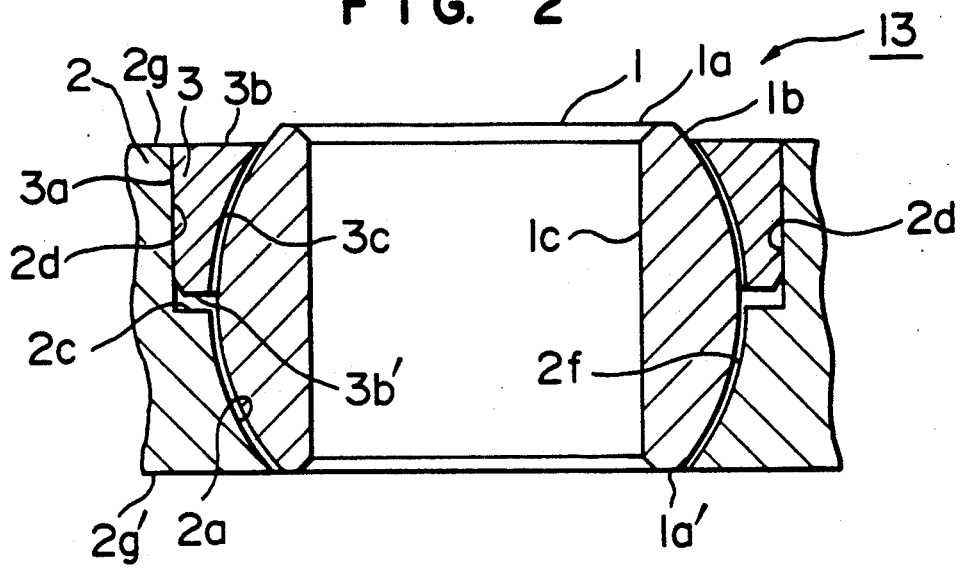
FIG. 2 is a vertical section of a self-aligning bearing incorporated in the compressor shown in FIG. 2.

Referring to FIG. 2, the self-aligning bearing 13 has the spherical bearing member 1 having a first through-hole 1c for rotatably supporting the rotary shaft 14 (shown in FIG. 1) and a convex spherical outer surface 1b. The opposite ends (upper and lower ends, as viewed in FIG. 2) of the spherical bearing member 1 define a pair of parallel flat end faces 1a and 1a' in which the through-hole 1c opens. The end face 1a is in sliding contact with the flange 14b (shown in FIG. 1) of the rotary shaft 14 so as to bear thrust loads applied to the rotary shaft 14.

The spherical bearing member 1 is supported by and held in the supporting member 2. The supporting member 2 has a second through-hole 2f. A part (lower part)

of the second through-hole 2f is closed to the end face 1a' of the spherical bearing member 1 and has a concave spherical inner surface 2a which rotatably supports a portion of the outer surface 1b of the spherical bearing member 1. The remaining part (upper part) of the second through-hole 2f has a cylindrical inner surface 2d. An annular shoulder portion 2c is formed between the cylindrical inner surface 2d and the concave spherical inner surface 2a and extends radially inward from the cylindrical inner surface 2d to the concave spherical inner surface 2a.

The self-aligning bearing 13 further has the bushing 3 in addition to the spherical bearing member 1 and the supporting member 2 described above. The bushing 3 has a concave spherical inner surface 3c rotatably supporting another portion of the outer surface 1b of the spherical bearing member 1 and a cylindrical outer surface 3a in close contact with the cylindrical inner surface 2d of the supporting member 2d. The bushing 3 holds the spherical bearing member 1 in position in the supporting member 2 while preventing their disengagement. It should be noted that the depth to which the bushing 3 is inserted into the space defined by the cylindrical inner surface 2d of the supporting member 2 is properly adjusted so that the gap between the spherical bearing member 1, on one hand, and the supporting member 2 and the bushing 3, on the other, has a desired appropriate size. Although, in FIG. 2, the outer (upper) end face 3b of the bushing 3 is flush with the upper surface 2g of the supporting member 2, this feature is not essential to the present invention. The outer end face 3b of the bush 3 is positioned below the upper end face 1a of the spherical bearing member 1.

This construction enables the end face 1a to rotatably support the flange 14a of the rotary shaft 14 and bear the thrust load on the rotary shaft 14.

The spherical bearing member 1 may be produced by, for example, a casting method or a powder metallurgical method. The supporting member 2 may be produced by, for example, a casting method, a cold plastic forming method, a powder metallurgical method or a machining method. The bush 3 may be produced by, for example, a cold plastic forming method, a powder metallurgical method or a machining method.

Figure 3A:
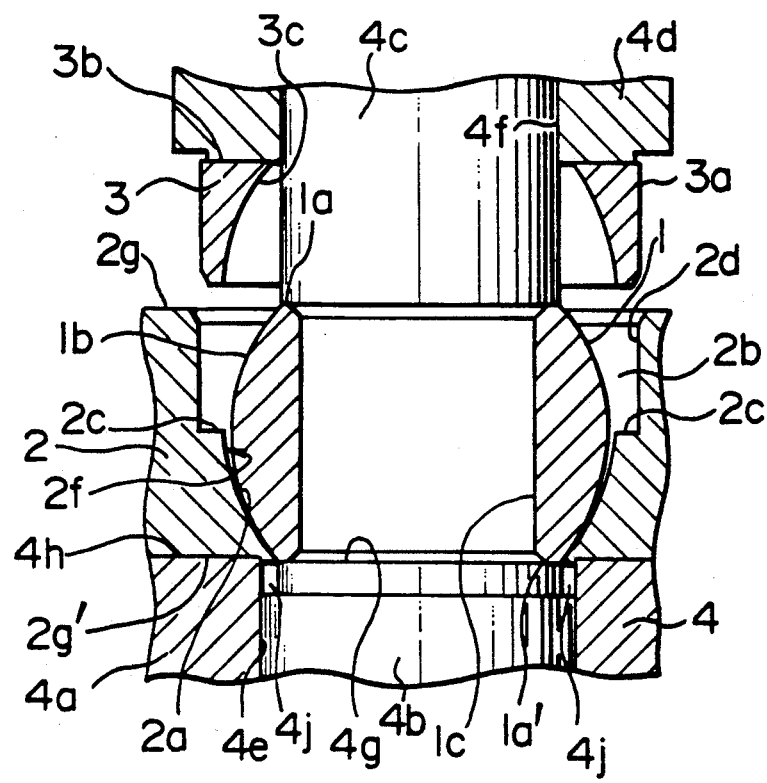
FIGS. 3A and 3B are vertical sections of the self-aligning bearing and a jig, which are referred to explain a method of assembling the bearing, FIG. 3A showing a state before the insertion of a bushing, FIG. 3B showing a state after the insertion.
Figure 3B:
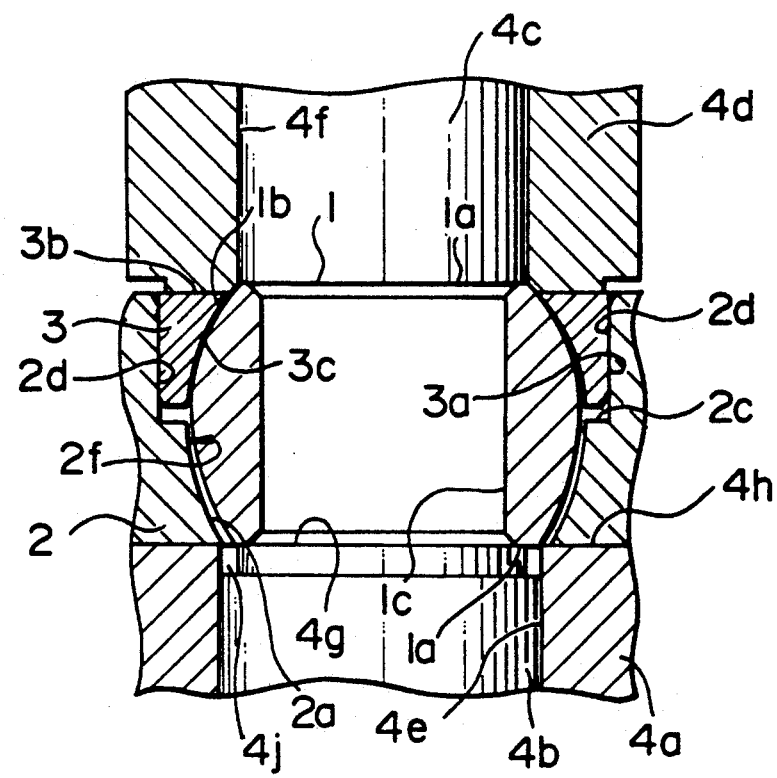

Next, referring to FIGS. 3A and 3B, a method of assembling the self-aligning bearing according to the present invention will be described. FIGS. 3A and 3B show, in fragmentary sections, the members of the self-aligning bearing and an assembly jig in order to explain a state (shown in FIG. 3A) before the insertion of the bushing and a state (shown in FIG. 3B) after the insertion.

The jig 4 for assembling the self-aligning bearing comprises: a columnar anvil (first anvil) 4b having a top surface 4g for supporting the lower end face 1a' of the spherical bearing member 1; an annular anvil (second anvil) 4a having a through-hole 4e for receiving the columnar anvil 4b, being vertically slidable relative to the columnar anvil 4b and having a top surface 4h for supporting the lower surface 2g' of the supporting member 2; a columnar pushing member (a first pushing member) 4c for pushing down the spherical bearing member 1 from above; and an annular pushing member (a second pushing member) 4d for pushing down the bushing 3, the member 4d having a through-hole 4f for receiving the columnar pushing member 4c and being vertically slidable relative to the columnar pushing member 4.

The columnar anvil 4b is formed with an annular recess 4j along the outer periphery of the top surface 4g of the anvil 4b so that the diameter of the top surface 4g is substantially equal to the diameter of the lower end face 1a' of the spherical bearing member 1.

The self-aligning bearing according to the present invention is assembled in the following manner. First, the supporting member 2 is placed upon the top surface 4h of the second anvil 4a, as shown in FIG. 3A. The spherical bearing member 1 is inserted into the through-hole 2f of the supporting member 2 until the lower end face 1a' of the member 1 is supported by the top surface 4g of the first anvil 4b. Subsequently, the first columnar pushing member 4c is lowered so that the spherical bearing member 1 is temporarily held between the top surface 4g of the first anvil 4b and the first pushing member 4c. Then, the first anvil 4b and the first pushing member 4c are vertically moved together so that the position of the spherical bearing member 1 relative to the supporting member 2 will be adjusted to a predetermined position in which the upper end face 1a of the spherical bearing member 1 projects upward from the upper surface 2g of the supporting member 2. When the spherical bearing member 1 has thus been positioned, the member 1 is firmly fixed at this position. The resultant state is shown in FIG. 3A.

Subsequently, the bushing 3 is placed below the second pushing member 4d, which is then lowered, so that the bushing 3 is inserted into the space defined by the cylindrical inner surface 2d of the supporting member 2. When the concave spherical outer surface 3c of the bushing 3 contacts the convex spherical outer surface 1b of the spherical bearing member 1, the downward movement of the second pushing member 4d is terminated. The resultant state is shown in FIG. 3B.

Each of the component members of the self-aligning bearing (i.e., the spherical bearing member 1, the supporting member 2 and the bushing 3) has been prepared beforehand as product having the correct dimension and the correct shape. Further, the above-mentioned predetermined position of the upper end face is of the spherical bearing member 1 relative to the upper surface 2g of the supporting member 2 has been determined beforehand by tests. Furthermore, an appropriate value of the depth to which the bushing 3 should be inserted has been determined beforehand by tests. Accordingly, if the self-aligning bearing is assembled by the above-described method, the gap between the spherical bearing member 1, on one hand, and the supporting member 2 and the bushing 3, on the other, has an appropriate size, thereby assuring a great reduction in the level of noise and vibration which would be generated as described hereinabove.

The method of assembling the self-aligning bearing is not limited to such a force-fitting method as described above. It is possible to employ shrinkage fitting or other joining method.

Although the first bearing 13 has been described in detail, the second bearing 12 is substantially the same as the first bearing 13 in construction and production method.

Figure 4:
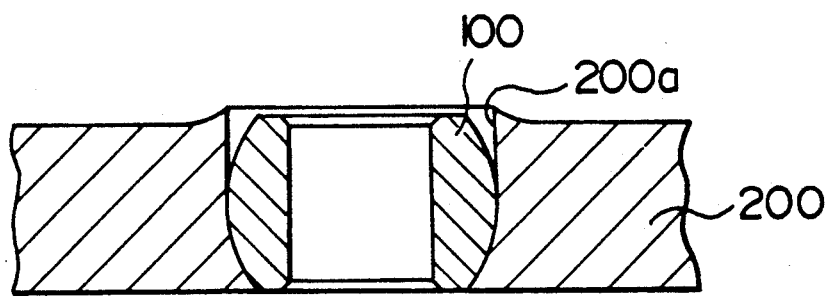
FIG. 4 is a vertical section of a self-aligning bearing of the prior art, the bearing being shown in its state before the plastic forming of the supporting member.
Figure 5:
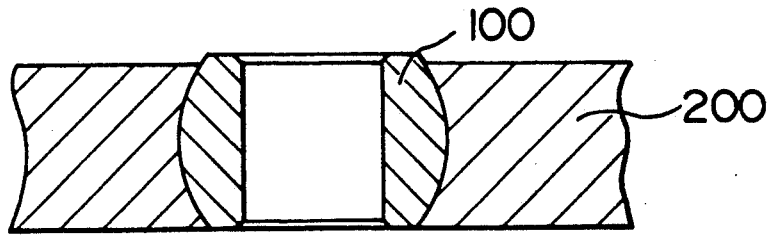
FIG. 5 is a vertical section of the self-aligning bearing of the prior art, the bearing being shown in its state after the plastic forming.

Referring to FIGS. 4 and 5, the assembly of the self-aligning bearing of the prior art will be briefly described. A spherical bearing member 100 is disposed in a through-hole 200a of a supporting member 200 in the manner shown in FIG. 4. Subsequently, the supporting member 200 is subjected to plastic working, whereby an upper edge portion of the through-hole 200a is deformed into a shape which fits the convex spherical outer surface of the spherical bearing member 100, thus obtaining a completed assembly, shown in FIG. 5. The spherical bearing member 100 is held in place in the thus deformed supporting member 200 while being prevented from becoming disengaged. The centering bearing of the prior art wherein the supporting member is subjected to plastic working entails the problems already described in the introductory of the part specification.

What is claimed is:

1. A closed-type electrically driven compressor comprising:
   a closed vessel;
   an electric motor disposed in said vessel;
   a rotary shaft driven by said electric motor;
   a compressing mechanism connected to said rotary shaft;
   a first bearing position between said compressing mechanism and said electric motor rotatably supporting said rotary shaft; and
   a second bearing positioned on that side of said electric motor remote from said compressing mechanism for rotatably supporting said rotary shaft,
   at least one of said first bearing and said second bearing comprising a self-aligning bearing comprising:
   a spherical bearing member having a convex spherical outer surface and a first through-hole for rotatably supporting said rotary shaft;
   a member supporting said spherical bearing member, said supporting member having a second through-hole, a part of said second through-hole having a concave spherical inner surface movably supporting the convex outer surface of said spherical bearing member, the remaining part of said second through-hole having a cylindrical inner surface, and an annular shoulder portion formed between said cylindrical inner surface and said concave spherical inner surface, said annular shoulder portion extending radially inwardly from said cylindrical inner surface to said concave spherical inner surface; and a bushing having a concave spherical inner surface movably supporting said convex outer surface of said spherical bearing member in cooperation with said concave spherical inner surface of said supporting member, said bushing further including a cylindrical outer surface fitted into said cylindrical inner surface of said supporting member, said bushing holding said spherical bearing member in position in said supporting member while preventing their disengagement, and
   wherein said first bearing comprises a self-aligning bearing whose supporting member is secured to an inner surface of said vessel, said rotary shaft has an eccentric portion drivingly connected to said compressing mechanism, and
   wherein the spherical bearing member of said self-aligning bearing includes a flat end face in which said first through-hole opens, said rotary shaft having a thrust surface in sliding contact with said flat end face.

2. A compressor according to claim 1, wherein said flat end face is offset from said supporting member toward said compressing mechanism, said rotary shaft having a flange having said thrust surface.

* * * * *